United States Patent [19]

Esch et al.

[11] Patent Number: 4,755,199
[45] Date of Patent: Jul. 5, 1988

[54] LINEAR DRIVE UNIT FOR CLEANING FILTERS

[76] Inventors: Hans W. Esch, Eidengesässer Strasse 30, D-6464 Altenhasslau; Michael Hoenigs, Hessenring 38, D-6365 Rosbach, both of Fed. Rep. of Germany

[21] Appl. No.: 84,728

[22] Filed: Aug. 13, 1987

[51] Int. Cl.[4] .............................................. B01D 46/04
[52] U.S. Cl. ......................................... 55/284; 55/302
[58] Field of Search ................. 55/283, 284, 287, 294, 55/302

[56] References Cited

U.S. PATENT DOCUMENTS

| | | | |
|---|---|---|---|
| 3,841,065 | 10/1974 | Espeel | 55/284 |
| 4,299,597 | 11/1981 | Detiker et al. | 55/284 X |
| 4,432,778 | 2/1984 | Porkinson et al. | 55/284 X |
| 4,674,278 | 6/1987 | Rognon | 55/284 X |

Primary Examiner—Charles Hart
Attorney, Agent, or Firm—Beveridge, DeGrandi & Weilacher

[57] ABSTRACT

A linear drive unit is proposed of a device (10) for cleaning of filtered fluids in particular, whereby the compressed air required for cleaning is emitted via a nozzle bar (21, 23). The nozzle bar (21, 23) extends from a cylinder (18) suppliable with compressed air and being movable along a piston rod passing (16) through the faces of the cylinder, said piston rod being enclosed by a partition wall (26) arranged stationary and dividing the cylinder interior into two chambers (28, 30). To supply the chambers (28, 30) with compressed air, the piston rod (16) is designed hollow in sections for the fluid to flow through, with each chamber being associated with a hollow section (32, 34) of the piston rod and having connections (42, 44) leading to it.

8 Claims, 2 Drawing Sheets

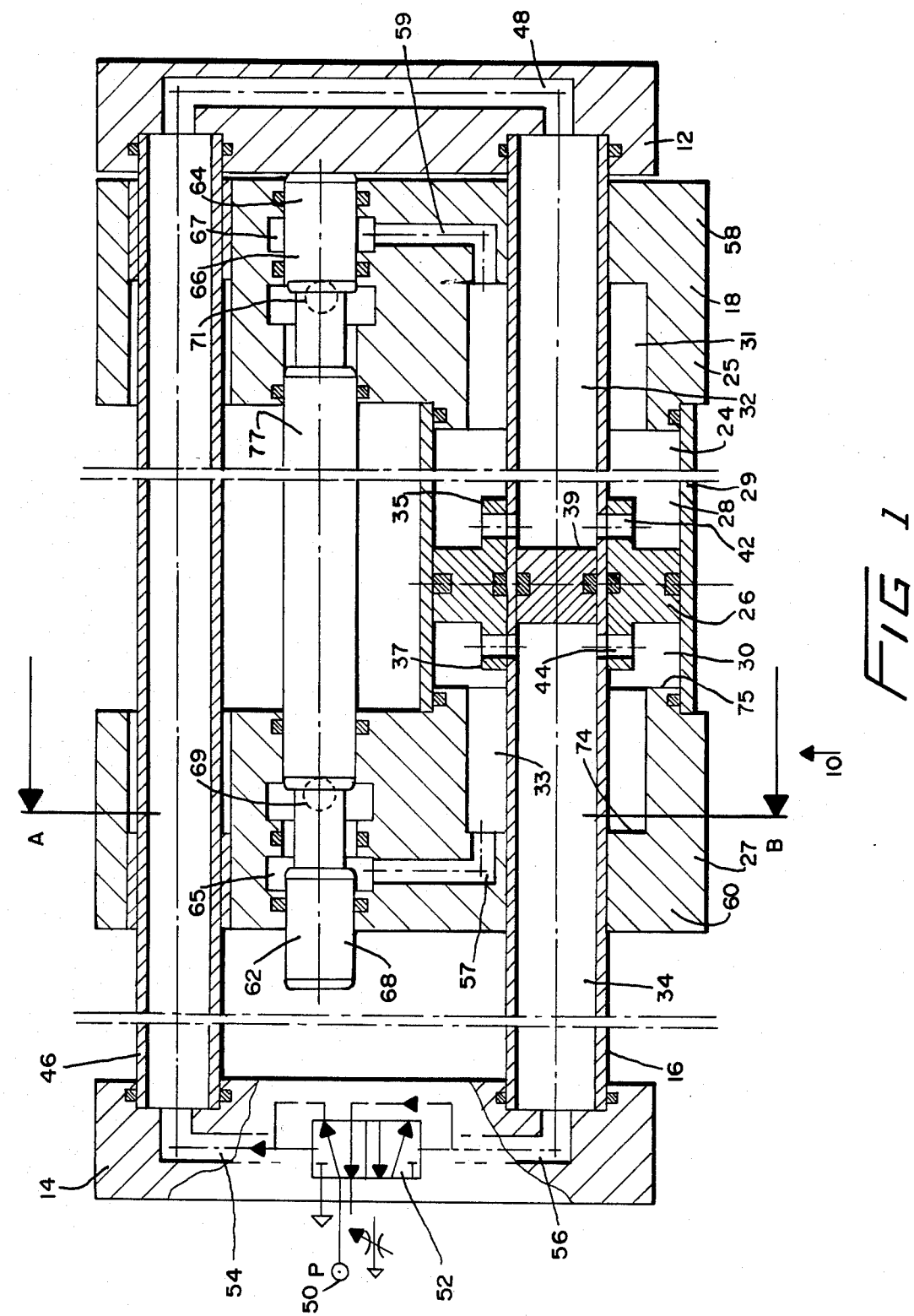

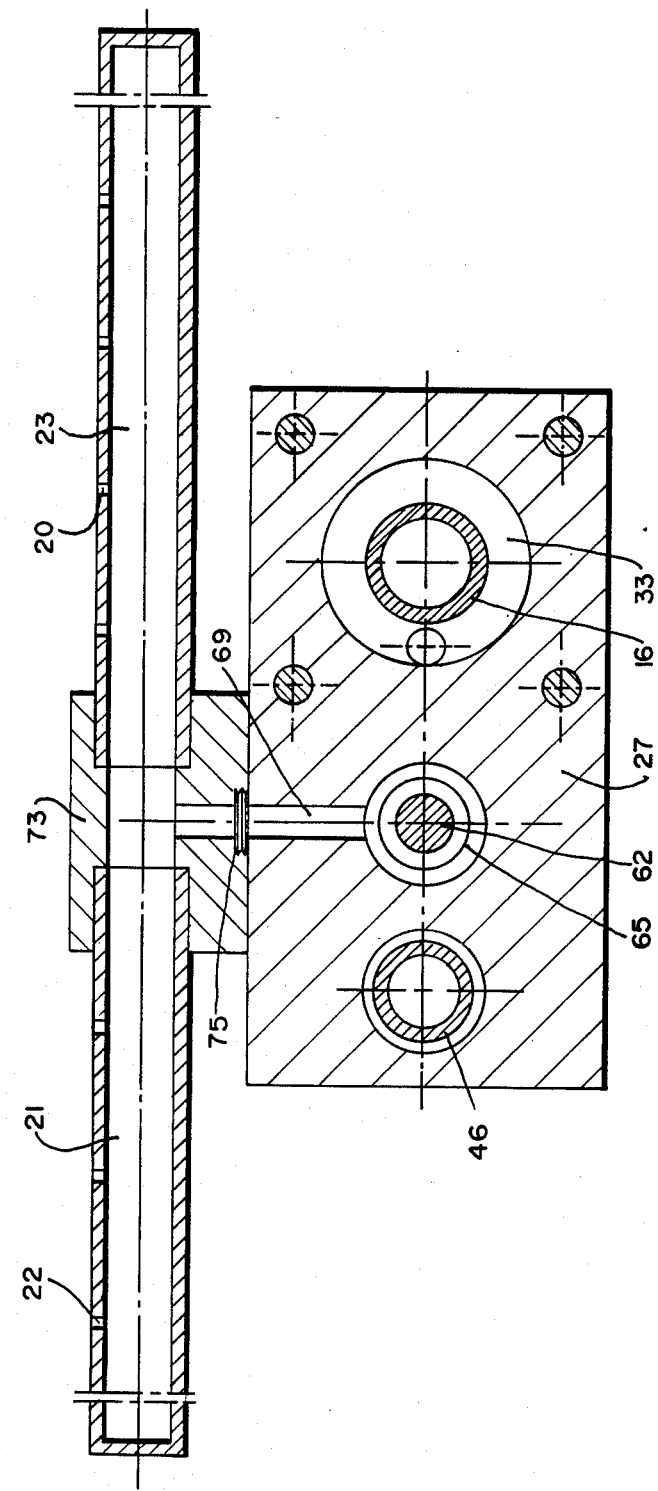

LINEAR DRIVE UNIT FOR CLEANING FILTERS

FIELD AND BACKGROUND OF THE INVENTION

The invention relates to a linear drive unit for cleaning filters by means of compressed air directed against them.

In the case of filter systems having suspended matter filter elements, for example, it is necessary for the filter elements to be cleaned from time to time. For this purpose, so-called nozzle bars are moved over the suspended matter filter elements to be cleaned in order to permit compressed air to flow off against the flow direction of the gas to be cleaned via nozzles provided in the nozzle bars. In order for the requisite compressed air to be emitted by the nozzle bars and for a cylinder accommodating the nozzle bar to be moved at the same time, flexible supply lines are provided to the nozzle bar and separate supply lines to the cylinder, said lines bearing the requisite compressed air. The flexible supply lines are however prone to malfunction, particularly when the gases to be cleaned have high temperatures. It is also necessary that the cylinder be moved along a guideway to ensure it cannot turn. Otherwise the guideway has no other function.

SUMMARY OF THE INVENTION

The object of the present invention is to design a device for cleaning filters such that it is possible to operate the cylinder accommodating the nozzle bar without problem and without the use of flexible supply lines, with turning prevention being ensured at the same time by functionally simple means.

The object is attained in accordance with the invention by a linear drive unit for cleaning filters by means of compressed air directed onto them, comprising:

a cylinder whose facing walls are penetrated by a piston rod running coaxially to the cylinder, the piston rod has two hollow sections extending along its longitudinal axis, between the sections the piston rod is surrounded by a piston sliding along the internal wall of the cylinder, each of the hollow sections of the piston rod is connected by holes to cylinder interior sections separated by the piston, each of the faces of the cylinder has a channel running in it which is connected on the one hand to the associated cylinder internal section and on the other hand to a nozzle bar emitting the compressed air, the channel has a connection between the cylinder internal section and the closure element releasing or closing the nozzle bar, the cylinder is guided along a guide rod running parallel to the piston rod, the guideway can be flowed through by compressed air and connected to one of the sections of the hollow piston rod, the other section of the piston rod and the guide rod are connected to a compressed air source or permit a pressure reduction alternately, where the compressed air flowing into the sections of the piston effects both the linear motion of the cylinder and cleaning of the filter.

In accordance with the invention, the compressed air is supplied via the piston rod, so that flexible supply lines are not required. The compressed air is here in from the faces into the piston rod, thereby moving the cylinder and supplying compressed air to the nozzle bar at the same time. In general one nozzle bar is arranged on each end of the cylinder to permit cleaning of one half of the filter each over the entire movement travel of the cylinder during forward and reverse motion (or one cylinder each in the case of twin arrangement). The stroke travel of the cylinder therefore preferably corresponds to half the filter width or, in the case of twin arrangement, to a full filter width.

The cylinder is secured against turning by the hollow guide rod running parallel to the piston rod. Since compressed air flows through the guide rod to one of the hollow sections of the piston rod, the compressed air supply only needs to be from one side, i.e. via a holding element, for example, that is connected to a face of the piston rod. This makes supply of the fluid particularly simple. The holding element can be designed as a 5/2-way valve so that only one compressed air connection is required. In the opposite face of the piston rod, there is—in a suitably provided holding device—a connection between the hollow guide pipe and the suitable hollow piston rod section. Depending on the direction of movement of the cylinder, either one or the other of the hollow sections of the piston rod is directly supplied with compressed air or after the compressed air has flowed beforehand through the hollow guide element.

Alternatively, the piston rod can comprise two tubular sections connected by a full-cylinder section that charges into the partition wall interacting with the inner wall of the cylinder. This permits a particularly simple construction that ensures a high degree of functioning efficiency and freedom from maintenance.

The element releasing or blocking the connection between cylinder chamber and nozzle bar is preferably designed as a tappet valve. The valves interact with limiting elements such that the nozzle bar supplied with compressed air is blocked when the cylinder has reached the limit position for the stroke direction, with the other tappet valve being opened at the same time. It is expedient to link up the valve tappets mechanically.

Two things are achieved by this arrangement:

Firstly, the compressed air flow is cut off as soon as the limit position has been reached, without additional limit switches being necessary and without having to shut off the compressed air externally.

Secondly, the connection of the cylinder chamber without compressed air to the nozzle bar must be shut off during the stroke motion to permit speed control by means of exhaust air throttling. The compressed air in the cylinder chamber from the previous stroke is displaced via the supply lines and a throttle valve.

In addition, it is possible to control the motion of the cylinder by oil pressure dampers or throttle valves, i.e. to set or regulate the speed of the extent required.

BRIEF DESCRIPTION OF THE DRAWINGS

Further details, advantages and features of the invention can be found not only in the claims and in the features which can be gathered therefrom—singly or in combination—but also in the following description of a preferred embodiment shown in the drawing.

FIG. 1 is a section through a linear drive unit according to the invention and

FIG. 2 is a section along line A-B in FIG. 1.

DETAILED DESCRIPTION OF PREFERRED EMBODIMENT

The figures show a device (10) for cleaning filters in particlar, comprising a cylinder or slide (18) movable along a piston rod (16), where the piston rod (16) is fastened at its face by holding devices (12) and (14) designed as square-shaped blocks. The slide (18) supplies nozzle bars (21), (23) with compressed air via connecting holes in order to supply compressed air to a filter (not shown) via nozzles (20) and (22). The nozzle bars (21) and (23) run in the area of the faces (58) and (60) of cylinder (18) and vertical to the valve piston (16), and parallel to the drawn plane of FIG. 1. Thanks to the arrangement of the nozzle bars (21) and (23) in the area of the faces (58) and (60), it is ensured that the compressed air can be emitted over almost the entire travel path of the cylinder (18).

The slide (18) comprises two square-shaped face/end sections (25)/(27) connected by a tube (29). The square-shaped sections (25) and (27) have cylindrical recesses (31) and (33) facing each other that lead into tubular connecting elements (29) and combine to form the slide/cylinder interior. The cylinder interior (24) is divided into two chambers (28) and (30) by a parttion wall (26) in the form of a cylindrical ring, in order to permit movement to the left or right along the piston rod (16) depending on the compressed air supply. The partition wall (26) abuts in sealing contact against the piston rod (16) and the inner wall of the tube (29), Flanges (35) and (37) project from the cylinder ring (26) and have holes to permit connections (42) and (44) to the hollow piston sections (32) and (34), with said sections being separated at the partition wall (26) by a plug (39) in sealing contact with the inner wall of the hollow piston rod (16).

A guide tube (46) runs parallel to the piston rod (16) and passes through the sections (25) and (27) of the slide (18). Since the guide tube (46) is also fixed at its ends by the holding devices (12) and (14), the cylinder/slide (16) is prevented thereby from turning. In accordance with the invention, the guide tube (46) is also designed hollow to allow compressed air to flow through it. The connection between the guide tube (46) and the hollow section (32) of the piston rod (16) is made by a channel (48) in the block (12). The block (14) arranged in the opposite face has holes (54) and (56) which are optionally connected via a 5/2-way valve (52) to a compressed air source (50).

Channels (57) and (59) extend from the annular recesses (31) and (33) of the slide (18) and lead into connecting chambers (65) and (67) penetrated by tappet valves (62) and (64). The valves (62) and (64) have cylindrical sections of varying diameter for optionally releasing or shutting off the chambers (65)/(67) and thereby the lines (57)/(59). The chambers (65) and (67) lead into the nozzle bars (21), (23) via holes (69)/(71) arranged vertical to the drawing plane in FIG. 1. The nozzle bars (21), (23) are held by a square-shaped block (73) releasable from the section (27) in order to fit restrictors into the connecting tubes with which the strength is settable of the compressed air emitted by the nozzles (20) and (22) and by the nozzle bars (21) and (23).

The tappet valves (62) and (64) are mechanically linked by a tube element (77) or by a rod. This ensures that when the hole (69) is open hole (71) is closed and vice versa. To do so, it is necessary that the tappet valves (62) and (64) can project with their cylindrical sections (66) and (68) optionally closing the chambers (65) and (67) laterally beyond the faces of the sections (25) and (27) in the direction of the holding devices (12) and (14). If for example the tappet valve (62) knocks against the holding device (14), it is slid into the section (27) so that chamber (65) is closed and thereby the connection (57). At the same time, the right-hand tappet valve (64) is slid outwards so that the connection (59) is opened and thereby permits compressed air to be supplied via the hole (71) to the connected nozzle bars (not shown).

The device (10) in accordance with the invention now functions as follows: in the embodiment, the cylinder or slide (18) is in its right-hand limit position. As a result the tappet (66) is moved to the left so that the line (59) extending from the chamber (24) is closed. Accordingly, the compressed air in the chamber (28) cannot flow to the nozzle bar connected to the hole (71). At the same time, the line (57) extending from the chamber (30) is released by the tappet (68) so that there is a connection between the chamber (30) and the nozzle bar (21), (23).

To start the cleaning procedure, compressed air is passed via the line (56) to the hollow section (34) of the piston rod (16) and now flows via the opening (44) to chamber (30), in order to act on the inner face walls (74) and (75). At the same time, the compressed air escapes from the chamber (28) via the opening (42), the tube section (32), the channel (48), the guide tube (46), the hole (54) and a throttle valve. As a result of the pressure reduction in the chambers (30) and (33) the cylinder (18) moves leftwards. At the same time, compressed air flows via the line (57) and the chamber (65) opened by tappet valve (62) to the opening (69) and thereby to the nozzle bar (21), (23).

The fact that the compressed air flowing through the chamber (30) simultaneously moves the cylinder (18) to the left is due to the connections (57) and (59) and the nozzles (20), (22) forming a flow resistance that effects a pressure reduction in the chambers (30) and (33).

As soon as the slide (18) reaches the left-hand limit position, the free outer end of the tappet (68) interacts with the holding device (14). As a result of this, the tappet (68) moves to the right so that the chamber (65) is closed by the element (62). At the same time, the tappet (66) of the tappet valve (64) is moved to the right, thereby releasing the chamber (67). The 5/2-way valve (52) is now switched over so that compressed air now longer flows via the hole (56) but via the hole (54) to the cylinder section (28).

Although the embodiment shows compressed air supply from the left-hand side via holes (54) and (56) of the device (10), it is of course also possible for the compressed air to be supplied from the opposite side, i.e. from holding device (12). Accordingly, there would then have to be a connection between the holes (54) and (56), with a valve being arranged in the channel (48). It is also possible for the compressed air not to flow via the guide tube (46), but instead for the hollow sections (32) and (34) of the piston rod (16) to be supplied with compressed air from their respective ends. Even with an appropriate design flexible supply lines connected to the moving cylinder (18) are not required.

Finally, it should be mentioned that the compressed air used can have a pressure of 6 bars, with a partial pressure of 2–3 bars being usable for moving the cylinder (18).

We claim:

1. A linear drive unit for cleaning filters by means of compressed air directed onto them, comprising:
   a cylinder whose facing walls are penetrated by a piston rod running coaxially to the cylinder,
   the piston rod has two hollow sections extending along its longitudinal axis,
   between the sections the piston rod is surrounded by a piston sliding along the internal wall of the cylinder,
   each of the hollow sections of the piston rod is connected by holes to cylinder interior sections separated by the piston,
   each of the faces of the cylinder has a channel running in it which is connected on the one hand to the associated cylinder internal section and on the other hand to a nozzle bar emitting the compressed air,
   the channel has a connection between the cylinder internal section and the closure element releasing or closing the nozzle bar,
   the cylinder is guided along a guide rod running parallel to the piston rod,
   the guideway can be flowed through by compressed air and connected to one of the sections of the hollow piston rod,
   the other section of the piston rod and the guide rod are connected to a compressed air source or permit a pressure reduction alternately,
   wherein the compressed air flowing into the sections of the piston effects both the linear motion of the cylinder and cleaning of the filter.

2. A linear drive unit according to claim 1, wherein the cylinder inner sections pass through the piston with the associated hollow sections of the holes connects the piston rod.

3. A linear drive according to claim 1, wherein the channel connecting the cylinder inner section to the nozzle bar has replaceable restrictors inserted inside it to adjust the compressed air emitted via the nozzle bars.

4. A linear drive unit according to claim 1, wherein the guide rod and the piston rod are mounted at their ends by holding devices of which one holding device has a 5/2-way valve for compressed air supply to the guide rod or to the hollow piston rod section extending from the holding device.

5. A linear drive unit according to claim 1, wherein the closing elements are designed as tappet valves.

6. A linear drive unit according to claim 5, wherein the tappet valves are rigidly connected to one another by a connecting element.

7. A linear drive unit according to claim 1, wherein the axes of the nozzle bars run parallel to the faces of the cylinder and parallel to the level of the guide rod and the piston rod.

8. A linear drive unit according to claim 1, wherein the cylinder comprises a table for accommodating the piston and two square-shaped sections are arranged on the face of the tube.

* * * * *